United States Patent
Le Taillandier De Gabory et al.

(10) Patent No.: US 9,660,762 B2
(45) Date of Patent: May 23, 2017

(54) SYSTEM AND METHOD FOR TRANSMITTING OPTICAL SIGNAL OVER MULTIPLE CHANNELS

(75) Inventors: Emmanuel Le Taillandier De Gabory, Tokyo (JP); Manabu Arikawa, Tokyo (JP); Toshiharu Ito, Tokyo (JP); Daisaku Ogasahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/425,538

(22) PCT Filed: Sep. 6, 2012

(86) PCT No.: PCT/JP2012/073384
§ 371 (c)(1),
(2), (4) Date: Mar. 3, 2015

(87) PCT Pub. No.: WO2014/038095
PCT Pub. Date: Mar. 13, 2014

(65) Prior Publication Data
US 2015/0229438 A1    Aug. 13, 2015

(51) Int. Cl.
*H04J 14/00* (2006.01)
*H04J 14/04* (2006.01)
(Continued)

(52) U.S. Cl.
CPC ....... *H04L 1/0041* (2013.01); *H04B 10/2581* (2013.01); *H04B 10/50* (2013.01);
(Continued)

(58) Field of Classification Search
None
See application file for complete search history.

(56) References Cited

U.S. PATENT DOCUMENTS

2012/0224807 A1*  9/2012  Winzer ............... G02B 6/14
                                                       385/28
2013/0236175 A1*  9/2013  Sethumadhavan ..... H04J 14/04
                                                       398/55

FOREIGN PATENT DOCUMENTS

EP    2 285 015 A2    2/2011
JP    2008-252444 A   10/2008

OTHER PUBLICATIONS

International Search Report for PCT Application No. PCT/JP2012/073384, mailed on Mar. 4, 2013.
(Continued)

*Primary Examiner* — Darren E Wolf

(57) ABSTRACT

A method for transmitting optical signals over multiple channels is provided, the method including: coding tributaries of data to be transmitted; firstly rearranging the coded tributaries, thereby scrambling the data among the coded tributaries and outputting rearranged coded tributaries; modulating optical carriers with data from one of the coded tributaries, creating modulated optical signals; transmitting the modulated optical signals; spatially multiplexing the modulated optical signals into spatially multiplexed channels; converting the spatially multiplexed optical signals into individual optical signals; receiving the individual optical signals through the multiple channels; demodulating the individual optical signals into electrical signals; decoding the electrical signals into decoded tributaries; and secondly rearranging the decoded of tributaries to recover the tributaries of data before step, wherein, a number of tributaries of data is equal to or more than two and is less than or equal to a number of the multiple channels.

20 Claims, 6 Drawing Sheets

(51) Int. Cl.
*H04B 10/2581* (2013.01)
*H04B 10/50* (2013.01)
*H04J 14/02* (2006.01)
*H04L 1/00* (2006.01)

(52) U.S. Cl.
CPC .............. *H04J 14/00* (2013.01); *H04J 14/02* (2013.01); *H04J 14/04* (2013.01)

(56) References Cited

OTHER PUBLICATIONS

Dayou Qian et al, "101.7-Tb/s (370×294-Gb/s) PDM-128QAM-OFDM transmission over 3×55-km SSMF using pilot-based phase noise mitigation," Optical Fiber Communication Conference and Exposition (OFC/NFOEC), 2011 and the National Fiber Optic Engineers Conference, PDPB5, Mar. 6-10, 2011.

S.Chandrasekhar et al, "WDM/SDM transmission of 10×128-Gb/s PDM-QPSK over 2688-km 7-core fiber with a per-fiber net aggregate spectral-efficiency distance product of 40,320 km b/s/Hz," Optical Communication (ECOC), 2011 37th European Conference and Exhibition on, Th.13.C.4, pp. 1-3, 2011.

Xiang Liu et al: "Performance improvement of space-division multiplexed 128-Gb/s PDM-QPSK signals by constructive superposition in a single-input-multiple-output configuration", Optical Fiber Communication Conference and Exosition (OFC/NFOEC), 2012 and the National Fiber Optic Engineers Conference, IEEE, Mar. 4, 2012 (Mar. 4, 2012), pp. 1-3, XP032174844, ISBN: 978-1-4673-0262-3.

Sakaguchi J et al: "SDM technology beyond 100 Tb/s", Opto-Electronics and Communications Conference (OECC), 2012 17th, IEEE, Jul. 2, 2012 (Jul. 2, 2012), pp. 553-554, XP032223126, DOI: 10.1109/OECC.2012.6276567 ISBN: 978-1-4673-0976-9.

* cited by examiner

SYSTEM AND METHOD FOR TRANSMITTING OPTICAL SIGNAL OVER MULTIPLE CHANNELS

This application is a National Stage Entry of PCT/JP2012/073384 filed on Sep. 6, 2012, the contents of all of which are incorporated herein by reference, in their entirety.

TECHNICAL FIELD

The present invention relates generally to optical communications technologies, in particular, to a system and a method for transmitting optical signal over multiple channels inside an optical fiber.

BACKGROUND ART

In order to optimize the investment in optical fiber links, it is desirable to increase the capacity of the links. This can be achieved by increasing the Spectral Efficiency (SE) of the signals transmitted on the links.

A common way to achieve it is to use more efficient modulation formats for the information to be transmitted. This can be used in conjunction with Wavelength Division Multiplexing (WDM) technology. Optical communication systems with transmission rates up to 10 Gb/s mainly utilize On Off Keying (OOK) for modulation, in which the information is coded on two amplitude levels of the lightwave signal. Moreover, higher capacity systems utilize the modulation scheme based on Quadrature Phase Shift Keying (QPSK), which codes the information on four phase levels. Therefore, two binary bits can be coded per transmitted symbol. In this manner, the necessary bandwidth of the optical spectrum required to transmit information is used more efficiently, enabling the transmission of more information on a fixed bandwidth. For instance, 100 Gb/s signals using Polarization Multiplexed QPSK (PM-QPSK) formats can be transmitted by means of 88 channels spaced by 50 GHz on the C-band spectrum. These systems are able to transmit 8.8 Tb/s over a single fiber.

Still higher capacities can be achieved with more complex modulation formats. For instance, in the non patent literature 1 (NPL1), it is disclosed that the use of Quadrature Amplitude Modulation format enables 101.7 Tb/s transmission. However, this increase in the transmission capacity of the system requires a high complexity in the transmitters and receivers. In addition, the transmission distance is limited to 165 km, which is not sufficient for long haul applications where transmission over more than 1000 km is required.

In order to increase the capacity of transmission through one fiber with maintaining the possibility of the transmission over long distances, new fiber technologies are being investigated. In the non patent literature 2 (NPL2), a Multi Core Fiber (MCF), which consists of several cores conducting optical signals within the same fiber, is used for 9 Tb/s transmission over 2688 km. By using the MCF, it is possible to spatially multiplex signals by using the multiplicity of cores, in addition to WDM in each core. Spatial Division Multiplexing (SDM) technologies such as the MCF technologies enable to increase the capacity transmitted through fibers without sacrificing the transmitted distance.

Another example of SDM technologies is illustrated in the patent literature 1 (PTL1). The optical communication system in the patent literature 1 (PTL1) contains a transmitter with a plurality of the light-emitting elements and a receiver with a plurality of photo-detectors. The transmitter has a serial-parallel conversion section outputting a plurality of parallel data by serial-parallel converting data and a modulating section outputting a plurality of first signals by modulating a plurality of parallel data. The transmitter further has an IDFT section inverse discrete Fourier converting a plurality of the first signals and leading out a plurality of second signals corresponding to the luminous intensities of a plurality of the light-emitting elements. The receiver has a DFT section leading out a plurality of fourth signals by discrete Fourier converting a plurality of third signals output in response to the quantities of the receptions of a light of a plurality of the photo-detectors and a demodulating section detecting a plurality of parallel data by demodulating a plurality of the fourth signals. The receiver further has a parallel-serial conversion section restoring data by parallel-serial converting a plurality of parallel data.

CITATION LIST

Patent Literature

PTL1: Japanese Patent Application Laid-Open Publication No. 2008-252444
PTL2: European Patent Application Laid-Open Publication No. EP 2 285 015 A2

Non Patent Literature

NPL1: Dayou Qian; Ming-Fang Huang; Ip, E.; Yue-Kai Huang; Yin Shao; Junqiang Hu; Ting Wang; "101.7-Tb/s (370×294-Gb/s) PDM-128QAM-OFDM transmission over 3×55-km SSMF using pilot-based phase noise mitigation," Optical Fiber Communication Conference and Exposition (OFC/NFOEC), 2011 and the National Fiber Optic Engineers Conference, PDPB5, 6-10 Mar. 2011
NPL2: Chandrasekhar, S.; Gnauck, A. H.; Liu, X.; Winzer, P. J.; Pan, Y.; Burrows, E. C.; Zhu, B.; Taunay, T. F.; Fishteyn, M.; Yan, M. F.; Fini, J. M.; Monberg, E. M.; Dimarcello, F. V.; "WDM/SDM transmission of 10×128-Gb/s PDM-QPSK over 2688-km 7-core fiber with a per-fiber net aggregate spectral-efficiency distance product of 40,320 km b/s/Hz," Optical Communication (ECOC), 2011 37th European Conference and Exhibition on, Th.13.C.4, 18-22 Sep. 2011

SUMMARY OF INVENTION

Technical Problem

In the case of the MCF, a crosstalk appears between the cores. The crosstalk causes interferences between the signals transmitted spatially. This crosstalk causes degradation of the received signal quality and at the end a reduction of the maximal capacity which can be transmitted through the MCF. Since the crosstalk increases as a function of the transmitted distance, the maximal length, on which the signals can be transmitted, is also reduced.

Furthermore, depending on the geometry of the MCF or the variations of characteristics of individual cores in the MCF, the crosstalk impairing the characteristics of individual cores varies. Moreover, individual variations of the characteristics of individual cores in the MCF cause the variation of individual received Optical to Signal Noise Ration (OSNR) through the transmitted channels within the MCF.

In the case where individual optical amplifiers are used for each core, similar variations in characteristics, such as a gain or a noise figure, cause further variations between transmitted channels in the MCF. The use of multi-core amplifiers results in similar variations of characteristics and ultimately similar differences between OSNR of transmitted channels. The difference in the quality of the received signal through each multiplexed channel causes a limit on the whole system, and the limit comes from the worst one among the multiplexed channels. Therefore the whole system limitation is drawn by the worst one among the multiplexed channels.

Moreover, in-band crosstalk appearing between cores of the MCF is susceptible to causing burst errors, which cannot be corrected by Forward Error Correction (FEC) techniques. These burst errors may appear on different spatially multiplexed channels because the crosstalk varies temporally, and cause system outages. Therefore, in the step of the system design, the system transmission capacity or transmission distance has to be reduced in order to avoid the outages.

The non patent literature 2 (NPL2) discloses an example of a device based on an optical switch. The optical switch exchanges the optical signals transmitted through the cores in the MCF in a cyclic manner at each span of the transmission line after each optical amplifier in the span. In this manner, the example of the non patent literature 2 (NPL2) enables to improve the quality of the worst received channel in the MCF. In the result, the system limit, which is drawn by the worst channel in the MCF, is improved and the transmission can be achieved on longer distances.

However, such a device as one used in the non patent literature 2 (NPL2) or the method for exchanging optical channels at each span has several limits.

First, the number of exchanges between the cores is linked to the number of spans of the system. Using several optical switches inside the transmission line within the same span would increase the cost of deployment because the system uses more optical devices. And the difficulty of deployment would increase because one has to insert more components within the transmission line, where the space is not always allowed. On the contrary, using such devices only at the amplifier in the span limits the effectiveness of the method because the number of exchanges decreases with span length at constant transmitted distance. And as the number of cores inside the MCF increases, some channels may not be equally transmitted through all cores.

Second, the method shown in the non patent literature 2 (NPL2) is not effective against burst errors because long sequences of transmitted symbols in one core are susceptible to being impaired by other long sequences of transmitted symbols in an adjacent core, and because core exchange is performed in long distances.

Furthermore, the use of inline optical devices to switch signals between cores causes additional optical insertion loss, which results in a penalty in the received OSNR of the signals and therefore additional limits on the system. Such devices also cause polarization dependent loss, which also degrades the received signals.

Finally, optically exchanging the signal between cores requires tracking separately the index of the transmitted channel and the index of the physical core, on which the signal is transmitted at each span. This requires more network resources and complicates network operation.

Another example of SDM technologies is illustrated in the patent literature 2 (PTL2). The patent literature 2 (PTL2) shows an example of a Multiple Input Multiple Output (MIMO) transmission system for wireless communication. In the patent literature 2 (PTL2), different MIMO channels are transmitted with different penalty factors. Code words are generated and mapped across multiple MIMO antennas in order to increase the throughput and the reliability of the system. However, in the case of optical communication channel, in which bit rate is typically over 100 Gb/s and the digital signal processing (DSP) is performed with at most two digital samples per transmitted symbols, the optical communication channel does not satisfy the requisite for the channel estimation and hypothesis verification method shown in the patent literature 2 (PTL2). Moreover, in the optical communications, the carrier frequency and the signal baud rate are much higher, transmission distances are also longer, and more relative delay between channels arises, than those in the wireless communications. Therefore the technique shown in the patent literature 2 (PTL2) cannot be used for optical communications.

As mentioned above, there is a need for improvement of transmission system to transmit data over multiple channels in the optical communication in order to improve the system limits and the received signal quality, and to reduce system outage.

An exemplary object of the invention is to provide a system and a method for transmitting optical signal over multiple channels with an improved received signal quality, better system margins, and reduced system outages.

Solution to Problem

A method for transmitting optical signal over multiple channels according to an exemplary aspect of the invention includes: (a) firstly rearranging a plurality of tributaries of data to be transmitted in order to scramble the data among the plurality of tributaries; (b) transmitting optical signals modulated with rearranged data generated in step (a) over the multiple channels; (c) receiving the optical signals through the multiple channels; (d) demodulating the optical signals into a plurality of tributaries of the rearranged data; (e) secondly rearranging the plurality of tributaries of the rearranged data in order to recover the plurality of tributaries of data before step (a); and wherein, the number of tributaries of the rearranged data is equal to or more than two and is less than or equal to the number of the multiple channels.

A system for transmitting optical signal over multiple channels according to an exemplary aspect of the invention includes: a first re-arrange means for firstly rearranging a plurality of tributaries of data to be transmitted in order to scramble the data among the plurality of tributaries; a plurality of modulating means for transmitting optical signals modulated with rearranged data generated in the first re-arrange means over the multiple channels; a plurality of coherent front end means for receiving the optical signals through the multiple channels and demodulating the optical signals into a plurality of tributaries of the rearranged data; a second re-arrange means for secondly rearranging the plurality of tributaries of the rearranged data in order to recover the plurality of tributaries of data before being rearranged by the first re-arrange means; and wherein, the number of tributaries of the rearranged data is equal to or more than two and is less than or equal to the number of the multiple channels.

Advantageous Effects of Invention

An exemplary advantage according to the invention is to improve the system margin and to reduce the outage probability in a multiple channel optical transmission system.

DESCRIPTION OF EMBODIMENTS

First Exemplary Embodiment

Figure 1:
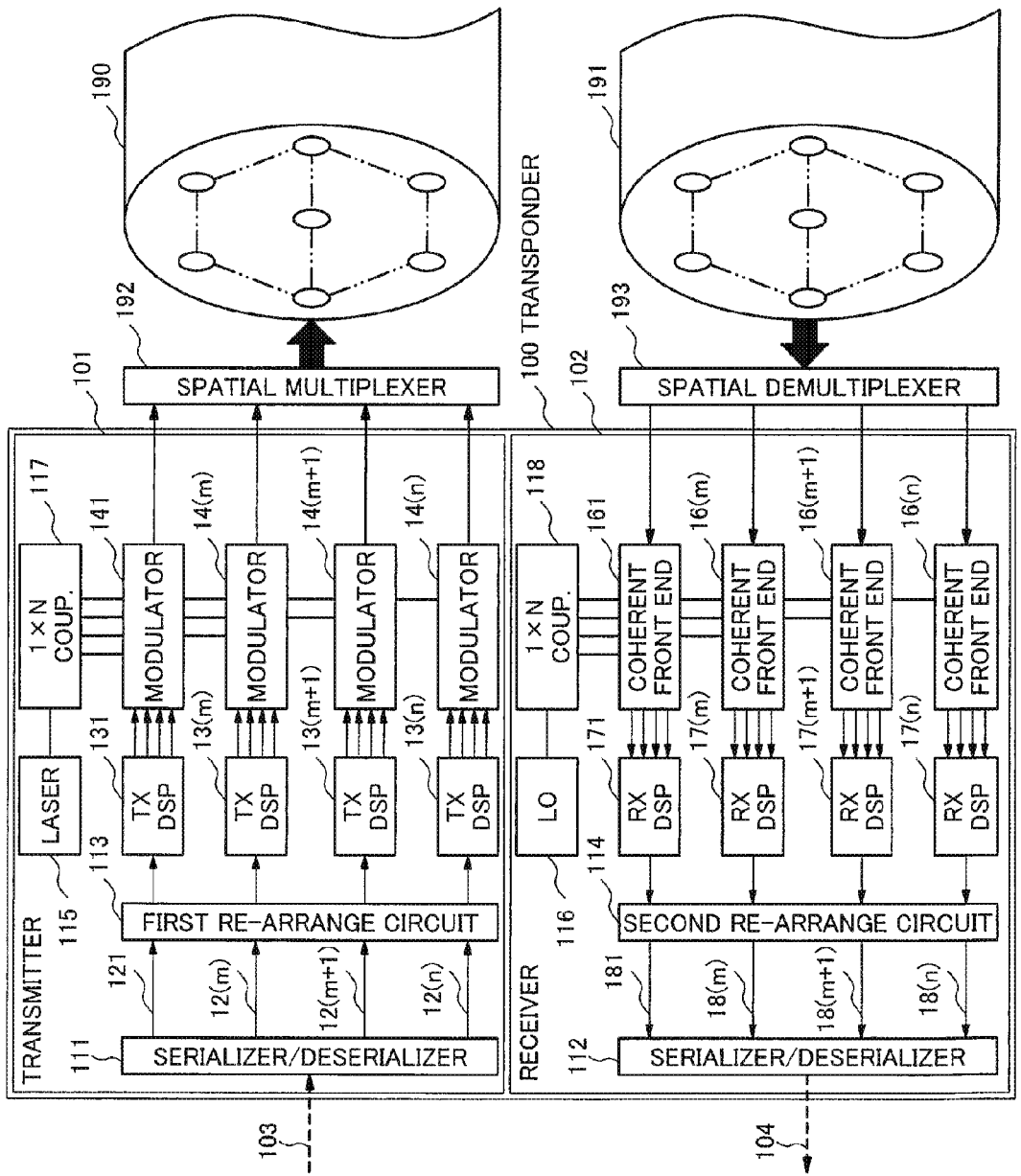
FIG. 1 is a schematic representation of an optical transponder according to the first exemplary embodiment of the invention.

FIG. 1 is a schematic representation of an optical transponder 100, including an optical transmitter 101 and an optical receiver 102. The optical transmitter 101 emits n-tuple parallel optical signals according to a binary data stream 103. A spatial multiplexer 192 multiplexes the n-tuple optical signals emitted by the optical transmitter 101 into a multicore optical fiber 190 which has multiple channels, that is, n-tuple cores, where "n" is an integer and is equal to or more than 2 (n≥2). Alternatively, the spatial multiplexer 192 can be integrated into the optical transmitter 101 or in the transponder 100.

A serializer/deserializer 111 converts the binary data stream 103 into n-tuple parallel tributaries denoted by the numerals from 121 to 12($n$) on FIG. 1. Considering the integer "m" which is equal to or more than 2 and is less than or equal to "n" (2≤m≤n), a first re-arrange circuit 113 rearranges the data contained in m-tuple tributaries denoted by the numerals from 121 to 12($m$) included in the n-tuple tributaries 121 to 12($n$), while it does not change the order of the data contained in the remaining (n-m)-tuple tributaries denoted by the numerals from 12($m$+1) to 12($n$).

Each of the tributaries rearranged by the first re-arrange circuit 113 is fed to each of transmitting side Digital Signal Processors (TX DSP) denoted by the numerals from 131 to 13($n$) on FIG. 1. The n-tuple DSP from 131 to 13($n$) can perform coding and signal processing. Each of n-tuple DSP outputs four tributaries, which are fed to n-tuple modulators denoted by the numerals from 141 to 14($n$) on FIG. 1. Each of the modulators from 141 to 14($n$) amplifies the electrical signals and imprints the information contained in the amplified signal onto an optical carrier provided by a polarization maintaining 1×n coupler 117, which splits the output of a laser 115. The modulation of the optical carriers can be carried out with polarization multiplexing IQ (In-phase/Quadrature) modulators. The n-tuple signals emitted by the n-tuple modulators from 141 to 14($n$) are output into the spatial multiplexer 192.

The optical receiver 102 receives n-tuple light signals output by a spatial demultiplexer 193 and demodulates them into a binary data stream 104. The spatial demultiplexer 193 converts the spatially multiplexed lightwave signal from a multicore optical fiber 191 which has n-tuple cores, into individual n-tuple light signals. Alternatively, the spatial demultiplexer 193 can be integrated into the receiver 102 or into the transponder 100.

Alternatively, the transponder 100 can emit light signal into and receive it from the same multicore optical fiber with n-tuple cores used in a bidirectional manner. Instead, the transponder 100 can emit light signal into and receive it from the same multicore optical fiber, which includes twice n-tuple (2×n) or more cores, and n-tuple cores are used by the n-tuple signals emitted by the transmitter 101 and the other n-tuple cores are used by the receiver 102.

The n-tuple optical signals output by the spatial demultiplexer 193 are received by n-tuple coherent front ends denoted by the numerals from 161 to 16($n$) on FIG. 1. Each of the coherent front ends contains a polarization diversity coherent mixer, balanced photo-detectors (PD), and transimpedance amplifiers. Each of the coherent front ends gets a local oscillator light from a 1×n polarization maintaining coupler 118, which splits the output of a local oscillator (LO) 116 into n-tuple local oscillator light.

The outputs of the n-tuple coherent front ends are connected respectively to n-tuple receiving side DSP (RX DSP) units denoted by the numerals from 171 to 17($n$). Each of the receiving side DSP has four analog-to-digital converters (ADC) and circuits performing compensation of the linear impairments of the transmission line, polarization demultiplexing, recovery of carrier phase, and decoding process. In addition, the DSP compensates for the skew appearing between multiple channels during the transmission over the multicore optical fiber 191.

Each output of the n-tuple DSP is considered as a tributary and m-tuple outputs of them are rearranged by a second re-arrange circuit 114. The m-tuple tributaries to be rearranged can be retrieved by spatial positioning or spatial convention because the optical receiver 102 has the same convention as the optical transmitter 101 has. The spatial convention includes the number or the function of each core depending on its location, and the way to group the cores.

The n-tuple tributaries output by the second re-arrange circuit 114 are denoted by the numerals from 181 to 18($n$) on FIG. 1, among which the m-tuple tributaries are rearranged and denoted by the numerals from 181 to 18($m$). In contrast, the remaining (n-m)-tuple tributaries from 18($m$+1) to 18($n$) are not affected by the second re-arrange circuit 114.

The serializer/deserializer 112 converts the n-tuple signal tributaries 181 to 18($n$) into the binary data stream 104. The binary data streams 103 and 104 are respectively fed into and recovered by the optical transponder 100 and have the same logical convention, which includes the number of data lane and the way to group the data. The binary data streams 103 and 104 may be composed of several parallel tributaries with lower rates.

Considering the fact that m-tuple tributaries of the data emitted and received by the transponder 100 are rearranged before transmission and after reception, the transponder 100 performs parallel transmission on m-tuple channels.

Now, an example of the first re-arrange circuit 113 and the second re-arrange circuit 114 is described below. Both these circuits are provided with "n" times "n" (n×n) switches. Considering the index "i" as the integer denoting the number of the symbol increasing with time, in the i-th data, the k-th input and the k-th output of the first re-arrange circuit 113, the k-th input and the k-th output of the second re-arrange circuit 114 are respectively represented by I(113,k,i), O(113, k,i), I(114,k,i), O(114,k,i). The programming of the switches included in the first re-arrange circuit 113 and the second re-arrange circuit 114 can be performed as follows:

$$l \equiv 1+(k+i)(\bmod m) \quad (1)$$

In the formula (1), "l" is the integer defining the remainder of the arithmetic division of (k+i) by m.

$$\text{For all } k \leq m, O(113,l,i)=I(113,k,i) \quad (2)$$

$$\text{For all } k>m, O(113,k,i)=I(113,k,i) \quad (3)$$

$$\text{For } j=1+m-l \quad (4)$$

where "l" is defined in the formula (1), $$\text{For all } k \leq m, O(114,j,i)=I(114,k,i) \quad (5)$$

$$\text{For all } k>m, O(114,k,i)=I(114,k,i) \quad (6)$$

The switch in the first re-arrange circuit 113 is defined by the formulae (2) and (3), whereas the switch in the second re-arrange circuit 114 is defined by the formulae (5) and (6). The operation of the switches scrambles the data of the different tributaries. Therefore, the probability of burst errors, which may be caused by crosstalk between cores of the MCF, and which impairs consecutive data bits, becomes reduced.

Second Exemplary Embodiment

Figure 2:
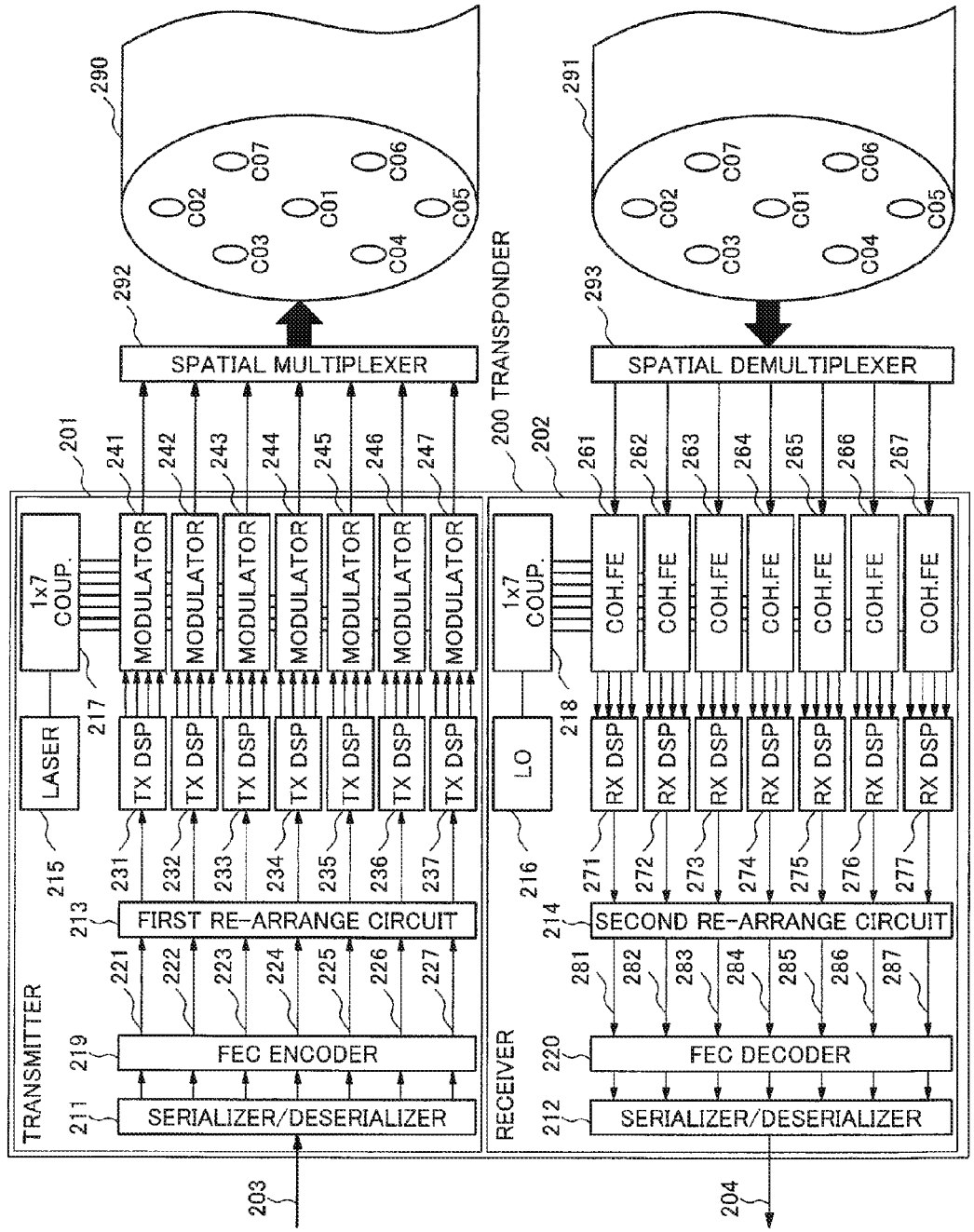
FIG. 2 is a schematic representation of an optical transponder according to the second exemplary embodiment of the invention.

FIG. 2 is a schematic representation of an optical transponder 200. The optical transponder 200 includes an optical transmitter 201 and an optical receiver 202. The optical transmitter 201 emits 7 optical signals according to a binary data stream 203. For the case of n=7 and m=n=7, a spatial multiplexer 292 and a multicore optical fiber 290 are similar to the spatial multiplexer 192 and the multicore optical fiber 190 on FIG. 1, respectively.

A serializer/deserializer 211 converts the binary data stream 203 into n-tuple parallel tributaries, which are regrouped and FEC (Forward Error Correction) encoded by a FEC encoder 219. The FEC frames resulting from the FEC encoder 219 are common for all tributaries output by the serializer/deserializer 211. The FEC encoder 219 outputs 7 tributaries denoted by the numerals of 221, 222, 223, 224, 225, 226, and 227 on FIG. 2.

For the case of n=7 and m=n=7, a first re-arrange circuit 213, transmitting side DSP (TX DSP) denoted by the numerals from 231 to 237, modulators denoted by the numerals from 241 to 247, a laser 215, and a 1×7 coupler 217 are similar to the first re-arrange circuit 113, the transmitting side DSP 131 to 13(n), the modulators 141 to 14(n), the laser 115, and the 1×n coupler 117, respectively. The 7 signals emitted by the 7 modulators 241 to 247 are output into the spatial multiplexer 292, and finally into the respective 7 cores of the multicore optical fiber 290 denoted by the symbols of C01, C02, C03, C04, C05, C06, and C07.

The optical receiver 202 receives 7 light signals output by a spatial demultiplexer 293 and demodulates them into a binary data stream 204. The spatial demultiplexer 293 converts the spatially multiplexed lightwave signal from the multicore optical fiber 291 including 7 cores denoted by the symbols from C01 to C07 respectively, into seven signals. These seven signals are received with 7 coherent front ends denoted by the numerals of 261, 262, 263, 263, 264, 265, 266, and 267.

For the case of n=7 and m=n=7, the coherent front ends 261 to 267, a 1×7 polarization maintaining coupler 218, a local oscillator (LO) 216, 7 receiving side DSP (RX DSP) denoted by the numerals from 271 to 277, and the second re-arrange circuit 214 are similar to the coherent front ends 161 to 16(n), the 1×n polarization maintaining coupler 118, local oscillator (LO) 116, the receiving side DSP (RX DSP) denoted by the numerals from 171 to 17(n), and the second re-arrange circuit 114, respectively.

The second re-arrange circuit 214 rearranges the tributaries into 7 tributaries denoted by the numerals from 281 to 287. These tributaries are FEC decoded by a FEC decoder 220 because they have common FEC frames encapsulating all of them within common frames. The outputs of the FEC decoder 220 are converted into the binary data stream 204 by the serializer/deserializer 212.

In one example of this exemplary embodiment, the first re-arrange circuit 213 and the second re-arrange circuit 214 are seven times seven (7×7) switches programmed by the formulae (2) and (5) for n=7 and n=m=7.

In another example of this exemplary embodiment, the first re-arrange circuit 213 and the second re-arrange circuit 214 are 7×7 switches programmed according to the following formulae:

$$l \equiv 1+(k+\text{Floor}(i/4))(\bmod 7) \quad (7)$$

In the formula (7), "l" is the integer defining the remainder of the arithmetic division of (k+Floor(i/4)) by 7, where the operation Floor corresponds to the bigger integer below the operated value.

$$O(213,l,i)=I(213,k,i) \quad (8)$$

$$\text{For } j=1+m-l \quad (9)$$

where "l" is defined in the formula (7);

$$O(214,j,i)=I(114,k,i) \quad (10)$$

In this case, the first re-arrange circuit 213 and the second re-arrange circuit 214 rearrange their input and output tributaries by group of 4 bits. In the case of seven-core MCF, according to the geometry of the MCF, the central core C01 has a crosstalk property of 3 dB higher than outer cores denoted by the symbols from C02 to C07. Indeed, the core C01 has six adjacent cores, whereas each of the cores C02 to C07 has only three adjacent cores. In this perspective, the channel transmitted through C01 will be more impaired by crosstalk and therefore the quality of the signal received from the core C01 will limit the system.

According to the first re-arrange circuit 213 and the second re-arrange circuit 214, the bit error rates of the tributaries 281 to 287 will be equal because the data transmitted by the core C01 will be split between the tributaries. Thus, the limit of the system is improved and the FEC decoding according to the FEC decoder 220 becomes possible for wider system conditions, because the worst bit error rate of the signal tributary is improved.

In yet another example of this exemplary embodiment, the first re-arrange circuit 213 and the second re-arrange circuit 214 are 7×7 switches programmed according to the following formulae:

if
$i \equiv 0 \pmod 3$, (11)

$$\begin{cases} O(213, 1, i) = I(213, 1, i) \\ O(213, 2, i) = I(213, 2, i) \\ O(213, 3, i) = I(213, 5, i) \\ O(213, 4, i) = I(213, 3, i) \\ O(213, 5, i) = I(213, 6, i) \\ O(213, 6, i) = I(213, 4, i) \\ O(213, 7, i) = I(213, 7, i) \end{cases}$$

and $$\begin{cases} O(214, 1, i) = I(214, 1, i) \\ O(214, 2, i) = I(214, 2, i) \\ O(214, 3, i) = I(214, 4, i) \\ O(214, 4, i) = I(214, 6, i) \\ O(214, 5, i) = I(214, 3, i) \\ O(214, 6, i) = I(214, 5, i) \\ O(214, 7, i) = I(214, 7, i) \end{cases}$$

if
$i \equiv 1 \pmod 3$, (12)

$$\begin{cases} O(213, 1, i) = I(213, 1, i) \\ O(213, 2, i) = I(213, 4, i) \\ O(213, 3, i) = I(213, 5, i) \\ O(213, 4, i) = I(213, 2, i) \\ O(213, 5, i) = I(213, 7, i) \\ O(213, 6, i) = I(213, 3, i) \\ O(213, 7, i) = I(213, 6, i) \end{cases}$$

and $$\begin{cases} O(214, 1, i) = I(214, 1, i) \\ O(214, 2, i) = I(214, 4, i) \\ O(214, 3, i) = I(214, 6, i) \\ O(214, 4, i) = I(214, 2, i) \\ O(214, 5, i) = I(214, 3, i) \\ O(214, 6, i) = I(214, 7, i) \\ O(214, 7, i) = I(214, 5, i) \end{cases}$$

if
$i \equiv 2 \pmod 3$, (13)

$$\begin{cases} O(213, 1, i) = I(213, 1, i) \\ O(213, 2, i) = I(213, 3, i) \\ O(213, 3, i) = I(213, 7, i) \\ O(213, 4, i) = I(213, 4, i) \\ O(213, 5, i) = I(213, 5, i) \\ O(213, 6, i) = I(213, 2, i) \\ O(213, 7, i) = I(213, 6, i) \end{cases}$$

and $$\begin{cases} O(214, 1, i) = I(214, 1, i) \\ O(214, 2, i) = I(214, 6, i) \\ O(214, 3, i) = I(214, 2, i) \\ O(214, 4, i) = I(214, 4, i) \\ O(214, 5, i) = I(214, 5, i) \\ O(214, 6, i) = I(214, 7, i) \\ O(214, 7, i) = I(214, 3, i) \end{cases}$$

In this case, the first re-arrange circuit 213 and the second re-arrange circuit 214 rearrange their input and output tributaries according to patterns that are stored in those circuits. Identically, the limit of the system is improved and the FEC decoding according to FEC decoder 220 becomes possible for wider system conditions.

According to the formulae of (11), (12), and (13), the bits of adjacent tributaries inputs from the core C02 to the core C07 are allocated to non-adjacent outputs within the same range. According to the geometry of the MCF, these bits are transmitted over non-adjacent cores from the core C02 to the core C07. Therefore, it becomes possible to reduce the probability of crosstalk on consecutive bits and the probability of burst errors. Accordingly, the outage probability of the system is also reduced.

Furthermore, according to the first re-arrange circuit 213 and the second re-arrange circuit 214, the bit error rates of the tributaries 281 to 287 become equal because the data transmitted by the core C01 are split between the tributaries. Thus, the limit of the system is improved and the FEC decoding according to FEC decoder 220 becomes possible for wider system conditions.

Figure 3:
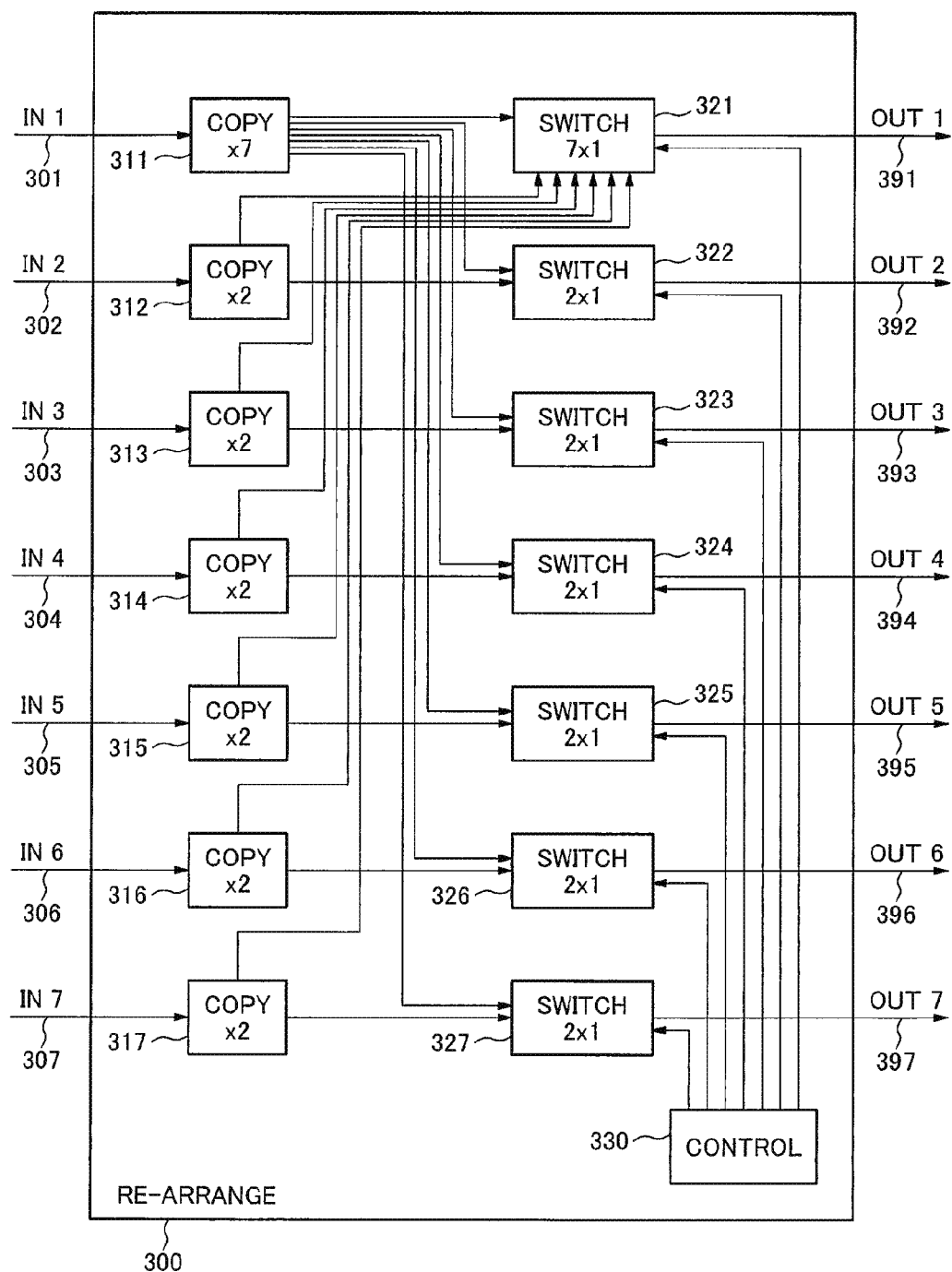
FIG. 3 is a schematic representation of a re-arrange circuit according to the second exemplary embodiment of the invention.

In FIG. 3, an example of a re-arrange circuit 300 is shown which is used as the first re-arrange circuit 213 or the second re-arrange circuit 214 in the optical transponder 200 on FIG. 2. The re-arrange circuit 300 has 7 inputs denoted by the numerals from 301 to 307 and 7 outputs denoted by the numerals from 391 to 397. As far as the first re-arrange circuit 213 on FIG. 2 is concerned, the inputs 301 to 307 of the re-arrange circuit 300 on FIG. 3 are assigned to the respective 7 tributaries 221 to 227 on FIG. 2. The 7 outputs 391 to 397 of the re-arrange circuit 300 on FIG. 3 are connected to the transmitting side DSP 231 to 237 on FIG. 2, respectively. Similarly, as far as the second re-arrange circuit 214 on FIG. 2 is concerned, the 7 inputs 301 to 307 of the re-arrange circuit 300 on FIG. 3 are connected to the respective receiving side DSP 271 to 277 on FIG. 2. The 7 outputs 391 to 397 of the re-arrange circuit 300 on FIG. 3 produce the respective 7 tributaries 281 to 287 on FIG. 2.

The input 301 of the re-arrange circuit 300 is connected to a signal divider 311. The signal divider 311 copies its input signal into seven identical signals, one of which is connected to a 7×1 switch 321, the other 6 ones of which is connected to 2×1 switches denoted by the numerals from 322 to 327, respectively. The other 6 inputs 302 to 307 are respectively connected to 6 identical signal dividers denoted by the numerals from 312 to 317.

One of the outputs from each of the 6 signal dividers 312 to 317 is connected to the 7×1 switch 321, while the other output is connected to a 2×1 switch. The 2×1 switches for the outputs of the signal dividers 312 to 317 are respectively denoted by the numerals from 322 to 327.

A control unit 330 controls the state of the 7×1 switch 321 and the state of the six respective 2×1 switches 322 to 327. Depending on the control unit 330, the 7×1 switch 321 outputs either a copy of the input 301 or one of the copies of the signals of the inputs 302 to 307. The output of the 7×1 switch 321 is provided for the output 391. Furthermore, depending on the control unit 330, the six 2×1 switches denoted from 322 to 327 respectively output either each copy of the signals of the inputs 302 to 307 or a copy of the signal of the input 301, which is provided for each of the six 2×1 switches through the signal divider 311. Finally, the outputs of the 2×1 switches 322 to 327 are respectively provided to the outputs 392 to 397.

Now, an example of the operation of the re-arrange circuit 300 is described, where the re-arrange circuit 300 is used for the first re-arrange circuit 213 and the second re-arrange circuit 214 on FIG. 2. As the structure of multicore optical fibers 290 and 291 is shown in FIG. 2, the center core C01 suffers an excessive crosstalk penalty of 3 dB over the outer cores C02 to C07. Therefore, the signal tributary transmitted through the center core C01 will be rearranged with the signal tributaries transmitted through the outer cores C02 to C07.

For the practical implementation, considering the index "i" as the integer denoting the number of the symbol increasing with time, I(a,i) represents the i-th input data, denoted by the integer "a", ranging between the input 301 and the input 307 of the re-arrange circuit 300. Similarly, O(b,i) represents the i-th output, denoted by the integer "b", ranging between the output 391 and the output 397 of the re-arrange circuit 300. The operation of the re-arrange circuit 300 can be summarized as follows:

Considering the integer $l \equiv 1+i \pmod 7$, that is, one plus the integer defining the remainder of the arithmetic division of "i" by 7, cyclically repeating states are indicated as the following formulae.

$$\begin{cases} O(391, i) = I(300+l, i) \\ O(390+c, i) = I(300+c, i) \ \forall \ (c \in [2, 7] \land c \neq l) \\ O(390+l, i) = I(301) \end{cases} \quad (14)$$

It is evident from the formula (14) that the respective outputs 391 to 397 will be equal to the respective inputs 301 to 307 for the case of l=1. In the other six cases of "l", the value of the output 391 and each value of the other six inputs will be switched from the case of l=0.

According to the first re-arrange circuit 213 and the second re-arrange circuit 214, the bit error rates of the tributaries 281 to 287 will be equal because the data transmitted by the core C0 will be split between the tributaries. Thus, the limit of the system is improved and the FEC decoding according to the FEC decoder 220 becomes possible for wider system conditions.

Furthermore, since the re-arrange circuit 300 is based on 7×1 switch and 2×1 switches, it does not suffer the contention problem that a 7×7 switch would suffer. As an additional representative benefit, it requires less buffer resource to implement and consumes less electrical power.

Now, a numerical simulation is performed to illustrate the advantageous effect of the present embodiment. Each of the parallel signals output by the modulators is 85.6 Gb/s PM-QPSK signal. The signal received by the corresponding optical receiver identical to the optical receiver 202 has an OSNR of 11 dB/0.1 nm. From the fiber modeling, each core has a crosstalk of −18 dB for the core C01 and −21 dB for each of the 6 cores C02 to C07, after transmission through 100 km. Without any rearranged tributary, using conventional transponder structures, the Bit Error Rate (BER) of the signal received through the center core C01 is 2.4E-3, while the BER of the cores C02 to C07 is 1.0E-3. The system margin drawn by the center core C01 is a 2.6 dB Q margin over a soft decision FEC threshold at 6.4 dB. By using the embodiment described above, the received BER for all cores is equal to 1.2E-3, which improves the system margin by 0.6 dB.

It is evident that the re-arrange circuit 300 can be generalized to including n-tuple inputs and n-tuple outputs with any number of "n", and one n×1 switch and (n−1)-tuple 2×1 switches.

Third Exemplary Embodiment

Figure 4:
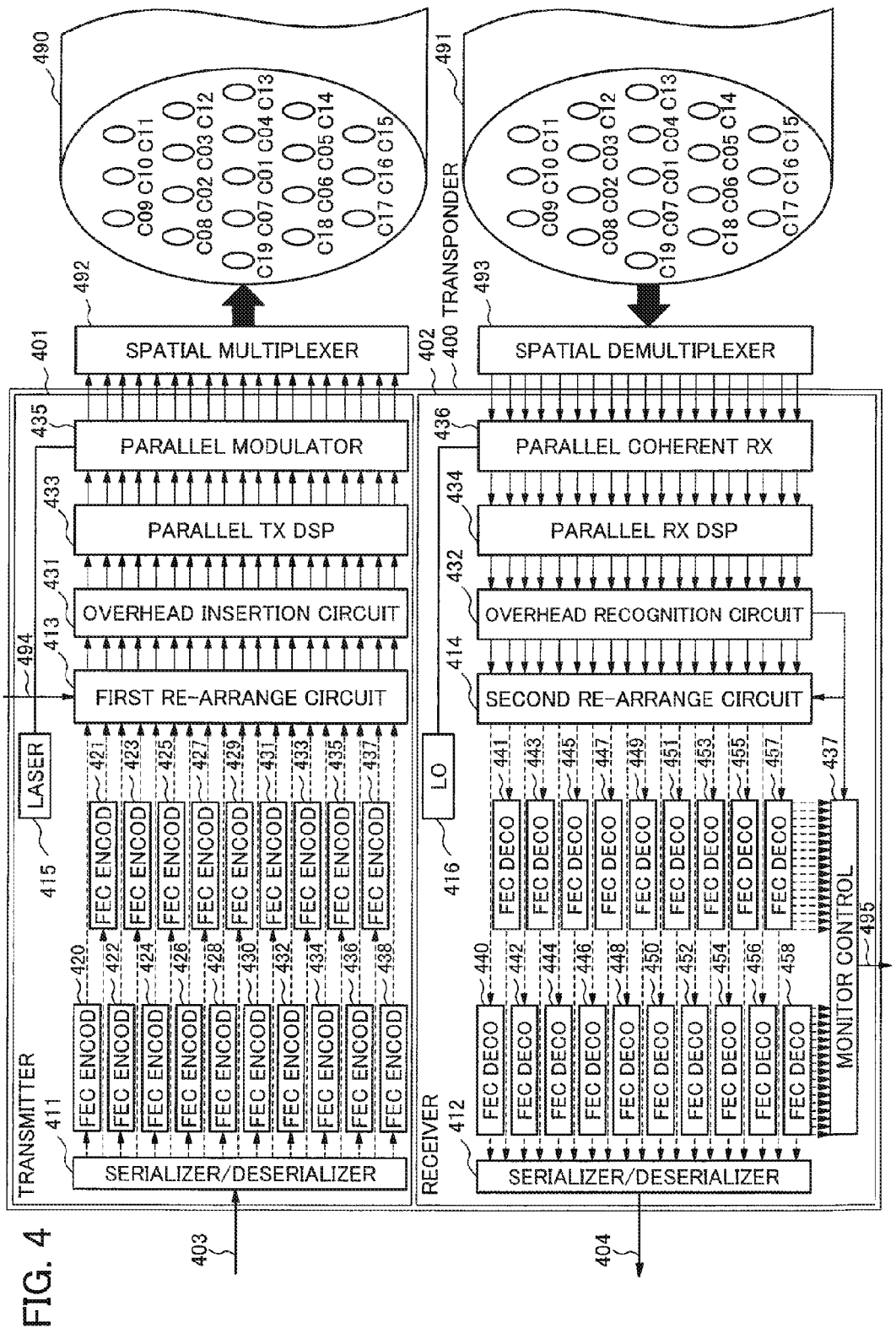
FIG. 4 is a schematic representation of an optical transponder according to the third exemplary embodiment of the invention.

FIG. 4 is a schematic representation of an optical transponder 400. The optical transponder 400 includes an optical transmitter 401 and an optical receiver 402. The optical transmitter 401 emits 19 optical signals according to a binary data stream 403. For the case of n=19, a spatial multiplexer 492 and a multicore optical fiber 490 are similar to the spatial multiplexer 192 and the multicore optical fiber 190 on FIG. 1, respectively.

A serializer/deserializer 411 converts the binary data stream 403 into 19 parallel tributaries, each of which is FEC encoded by individual FEC encoders denoted by the numerals from 420 to 438. The FEC frames resulting from the FEC encoders 420 to 438 are individually determined for each tributary output by the serializer/deserializer 411.

A first re-arrange circuit 413 rearranges m-tuple tributaries, where "m" is equal to or more than 2 and is less than or equal to "n" (2≤m≤n), while the remaining (n-m)-tuple tributaries are not rearranged by the first re-arrange circuit 413. The number "m" can be set and changed through a control signal 494 provided for the optical transponder 400. Alternatively, the number "m" can be set by the first re-arrange circuit 413 independently.

An overhead insertion circuit 431 inserts overheads on the signal tributaries depending on the number "m" and the m-tuple tributaries rearranged by the first re-arrange circuit 413. The overhead insertion circuit 431 can insert different overheads on the rearranged m-tuple tributaries and the (n-m)-tuple non-rearranged tributaries. Alternatively, the overhead can be the same for all tributaries and the tributaries can be retrieved by the geometry conventions of the multicore optical fiber 490. Furthermore, the overhead inserted by the overhead insertion circuit 431 can be inserted with frame lengths identical to the frames of the FEC encoders 420 to 438. Alternatively, the overheads inserted by the overhead insertion circuit 431 can be independent from the frames of the FEC encoders 420 to 438.

The parallel transmitting side DSP (parallel TX DSP) 433 is a parallel processing unit, which processes the 19 output tributaries of the overhead insertion circuit 431 and generates 19 output tributaries. The parallel transmitting side DSP 433 can be identical to the n-tuple transmitting side DSP 131 to 13(n) on FIG. 1 organized in a parallel architecture. The parallel modulator 435 is a parallel modulation unit which generates 19 optical signals modulated according to the 19 output tributaries of the output of the parallel transmitting side DSP 433.

The signal generated by the parallel modulator 435 uses a laser 415 as a single continuous wave (CW) source. The parallel modulator 435 can include the 1×n coupler 117 and the n-tuple modulators 141 to 14(n) on FIG. 1, which are organized in a parallel structure. A spatial multiplexer 492 is identical to the spatial multiplexer 192 on FIG. 1 for the case of n=19. A multicore optical fiber 490 is a 19-cores MCF and its cores are denoted by the symbols from C01 to C19.

The optical receiver 402 receives 19 light signals output by a spatial demultiplexer 493 and demodulates them into a binary data stream 404. The spatial demultiplexer 493 converts the spatially multiplexed lightwave signal from a multicore optical fiber 491 which has 19 cores denoted by the symbols from C01 to C19, into 19 signals. These signals are received by an integrated coherent front end 436, which is also represented by a parallel coherent receiver 436. The coherent front end 436 receives 19 parallel signals and mixes each of them with a local oscillator light generated by a local oscillator (LO) 416. The coherent front end 436 can be composed of the 1×n polarization maintaining coupler 118 and the coherent front ends 161 to 16(n) for n=19 on FIG. 1.

The parallel receiving side DSP (parallel RX DSP) 434 is a parallel processing unit. The parallel receiving side DSP 434 can be composed of the receiving side DSP 171 to 17(n) on FIG. 1 organized in a parallel structure. The parallel receiving side DSP 434 can alternatively process 19 signals within a single processor. Eventually, the parallel receiving side DSP 434 can feature a Multiple Input Multiple Output (MIMO) processing stage, which combines the received data from different outputs of the parallel coherent receiver 436.

After demodulation, the outputs of the parallel receiving side DSP 434 are analyzed by a overhead recognition circuit 432. The overhead recognition circuit 432 recognizes headers inserted on the transmitted signal by the overhead insertion circuit 431. The overhead recognition circuit 432 recognizes the number "m" of re-arranged tributaries and which tributaries are among the m-tuple re-arranged tributaries. This information is passed to a second re-arrange circuit 414 and the recognized headers are removed by the overhead recognition circuit 432. The information on the number "m" is passed by the overhead recognition circuit 432 to a monitor control unit 437.

According to the information passed by the overhead recognition circuit 432, the second re-arrange circuit 414 reorganizes the 19 tributaries received from the overhead recognition circuit 432, in order to recover the original order before rearrangement by the first re-arrange circuit 413. Each of the output tributary of the second re-arrange circuit 414 is FEC decoded by FEC decoders. The 19 FEC decoders are denoted by the numeral from 440 to 458. The outputs of the FEC decoders 440 to 458 are converted into a binary data stream 404 by a serializer/deserializer 412.

The monitor control unit 437 monitors the error counter of the 19 individual FEC decoders 440 to 458, and outputs the individual processed BER as well as the number "m" as a signal 495 to the outside of the optical transponder 400.

Now, an example of the operation of the optical transponder 400 is explained. Each of the parallel signals output by the parallel modulator 435 is 85.6 Gb/s PM-QPSK signal. The signal received by the corresponding optical receiver 402 has an OSNR of 11 dB/0.1 nm. The optical transponder 400 has the necessary information on the structure of the multicore optical fiber 490 to which it is connected, including the specification on different crosstalk values for the different cores C01 to C19. The center core C01 has a crosstalk of −17 dB, the inner cores C02 to C07 have a crosstalk of −20 dB and the outer cores C08 to C19 have a crosstalk of −22 dB.

The first re-arrange circuit 413 evaluates the received BER by means of internal Look-Up Tables (LUT). The BER(i) for the individual core C(i) is described as follows if no rearrangement is performed:
BER(01)=1.46E-2,
BER(i)=4.09E-3 for 2≤i≤7, and
BER(i)=1.32E-3 for 8≤i≤19.

BER(i) is sorted in a descending order with respect to the parameter "i". The first re-arrange circuit 413 determines the number "m"(=4) so that the following equation will be satisfied.

$$\frac{BER(01) + \sum_{i=19}^{i \geq m+1} BER(i)}{m} \leq BER(02)$$

According to this estimation, the first re-arrange circuit 413 rearranges the data of the tributary 1 with those of the tributaries 19 to 16 and inserts the corresponding overhead. After reception, the overhead recognition circuit 432 in the optical receiver 402 receives the signal emitted by the optical transmitter 401. The second re-arrange circuit 414 rearranges the data according to the overhead recovered by the overhead recognition circuit 432.

In this case, the BER for the tributary 01 monitored by the FEC decoder 440 is equal to those of the tributaries 16 to 19 and is equal to 3.97E-3. The system limit is no longer determined by the tributary transmitted through the center core C01, but instead is now determined by each tributary of inner cores C02 to C07 with a BER of 4.09E-3. The system margin has been improved by 1.67 dB according to this embodiment.

Alternatively, after determining the number m=4 and rearranging the tributary 1 with tributaries 19 to 16, the first re-arrange circuit 413 recursively performs the calculation on the non rearranged tributaries 2 to 15. In addition to the rearrangement of the tributary 1 with tributaries 16 to 19, the recursive rearrangement is performed so that respective tributaries are independently rearranged together: 2 with 15, 3 with 14, 4 with 13, 5 with 12, 6 with 11, and 7 with 10. The remaining tributaries 8 and 9 remain non-rearranged. The BER of the newly rearranged tributaries becomes equal to 2.7E-3, which improves the system margin by another 0.4 dB according to this implementation of the present embodiment.

Alternatively, the first re-arrange circuit 413 rearranges all tributaries together according to the re-arrange circuit 300 shown in FIG. 3 for a configuration with 19 inputs and 19 outputs. The BER of every received tributary according to the above simulation is equal to 2.89E-3, which improves the system margin by 2 dB.

Figure 5:
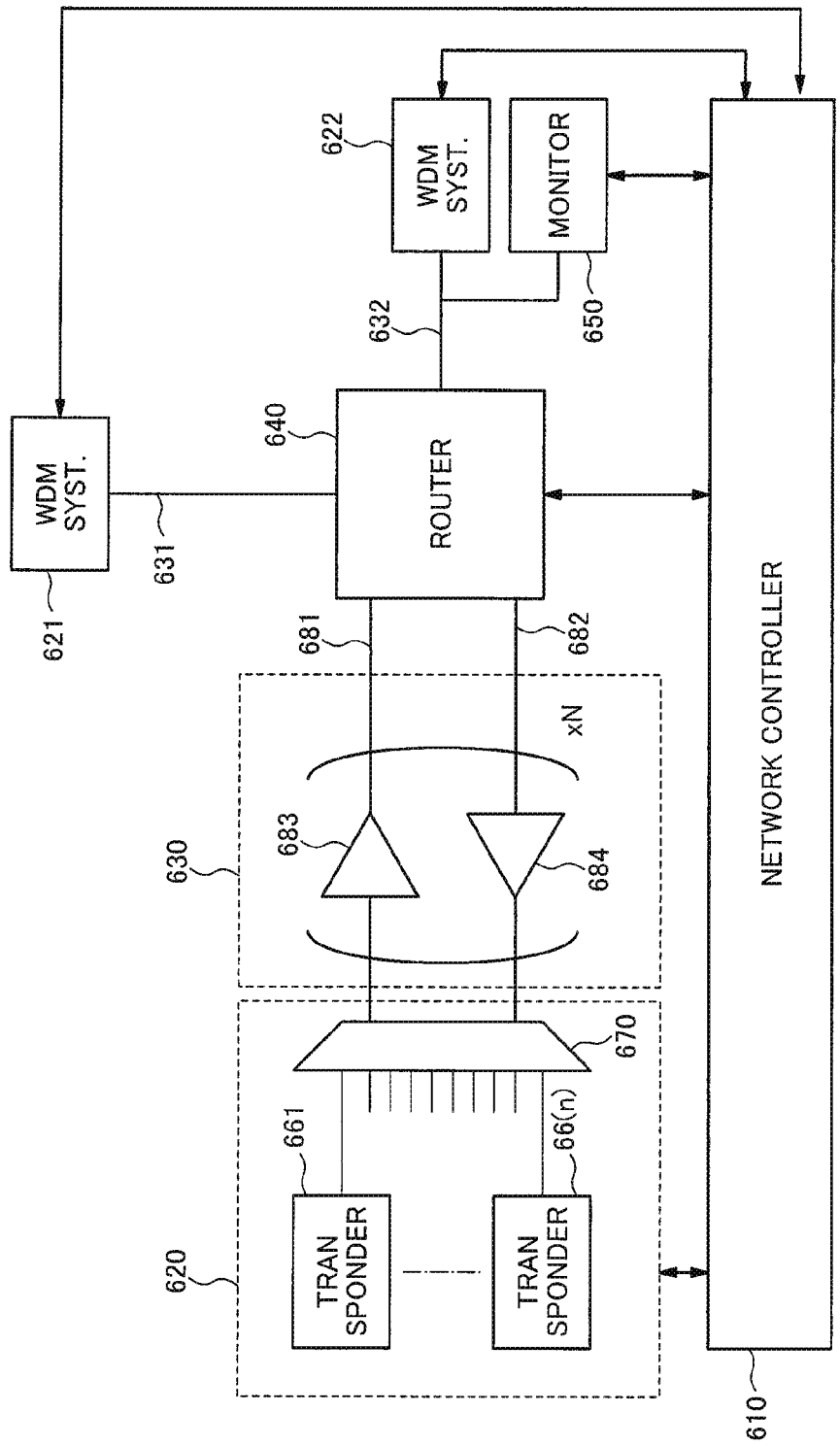
FIG. 5 is a schematic representation of an optical network using an optical transponder according to the third exemplary embodiment of the invention.

FIG. 5 is the schematic representation of an optical network, in which the optical transponder of the present embodiment is used. A WDM system 620 as a terminal base includes n-tuple optical transponders denoted by the numerals from 661 to 66(n). The outputs of n-tuple optical transponders are multiplexed in WDM by an arrayed waveguide 670. The optical transponders 661 to 66(n) are implemented by using the present embodiment.

The optical transponders 661 to 66(n) are identical to the optical transponder 400 on FIG. 4 and are set to emit optical signals with different carrier wavelengths. Alternatively, the order of processing for WDM and SDM can be inverted.

A fiber pair 630 is composed of two multicore optical fibers (MCF) denoted by 681 and 682, which transmit signals in the opposite direction. The multicore optical fibers (MCF) 681 and 682 are identical to the multicore optical fiber 490 on FIG. 4. The fiber pair 630 includes N spans of the multicore optical fibers 681 and 682 and respective multicore Erbium Doped Fiber Amplifiers (EDFA) 683 and 684 amplifying the optical signals.

WDM systems 621 and 622 are identical to the WDM system 620. Fiber pairs 631 and 632 are identical to the fiber pair 630. A router 640 can switch signals depending on a wavelength or cores between the WDM systems 620, 621, and 622 which are connected through the respective fiber pairs 630, 631, and 632. In addition, a monitor unit 650 is placed next to the WDM system 622 and monitors characteristics of the signals received at the place of the WDM system 622. A network controller 610 controls the WDM systems 620, 621, 622, and the router 640.

Now, an example of the operation is described below. The optical transmitters 401 in the optical transponders 661-66

(n) in the WDM system 620 have set the numeral "m", which indicates the number of rearranged tributaries, for 19 equal to "n". All the signals emitted at the WDM system 620 are received at the WDM system 622. The optical receivers 402 in the optical transponders 661-66(n) in the WDM system 622 identify the number of m=19 according to their overhead recognition circuits 432.

The network controller 610 now requires the signals through the cores C18 and C19 emitted by the WDM system 620 to be rerouted to the WDM system 621 by the router 640. On the other hand, the remaining signals through the cores C01 to C17 continue to be received by the WDM system 622. However, since all the tributaries are rearranged by the first re-arrange circuit 413 in the WDM system 620, the signals through the cores cannot be rerouted independently. Therefore, the network controller 610 orders the first re-arrange circuit 413 through the control signal 494 to limit "m" to 17 in order to reroute the signals. The rearrangement performed by the first re-arrange circuit 413 is reconfigured accordingly.

In the WDM system 622, the overhead recognition circuit 432 detects the new value of m=17 and finds out the fact that the signals through the cores C18 and C19 are no longer rearranged with those of the cores C01 to C17. The rearrangement performed by the second re-arrange circuit 414 is reconfigured accordingly.

According to the second example of the operation, the optical transmitters 401 in the optical transponders 661-66(n) in the WDM system 620 have set the numeral "m" for 4 in order to rearrange the tributary 1 with the tributaries 16 to 19. All the signals emitted at the WDM system 620 are received at the WDM system 622. The optical receivers 402 in the optical transponders 661-66(n) in the WDM system 622 identify the number of m=4 and the rearranged tributaries according to their overhead recognition circuits 432. Due to an incident causing an excessive loss, for example, in the core C08 in the fiber pair 632, signal degradation appears.

In the first aspect, the FEC decoders 448 in the optical transponders 400 in the WDM system 622 detect a drop of the received BER down to 1.5E-2. The network controller 610 performs the calculation of the following formula (15) on the BER given by the individual FEC decoders 441 to 455 of the non rearranged tributaries in the WDM system 622.

$$\frac{BER(n) + \sum_{i=1}^{i \leq m-1} BER(i)}{m} \leq BER(n-1) \quad (15)$$

As a result of the calculation, it is obtained that the number of "m" is equal to 4. Accordingly, the network controller 610 orders the first re-arrange circuits 413 in the optical transponders 400 in the WDM system 620 to rearrange the tributary 8 with tributaries 12 to 15 through the control signals 494. As a result, the system limit, which has been degraded by the BER of 1.5E-2 for the core C08, is now relieved by the equal BER of 4.06E-3 for the cores C08 and C12 to C15. This corresponds to an improvement of the system margin by 1.73 dB.

In an alternate aspect, monitor unit 650 detects an excessive drop in the received OSNR in the received signal for the core C08. Identically, the network controller 610 performs the calculation of the formula (15) on the basis of an assumed BER which is obtained from the estimations based on measured OSNR. As a result of the calculation, it is obtained that the number of "m" is equal to 4. Accordingly, the network controller 610 orders the first re-arrange circuits 413 in the optical transponders 400 in the WDM system 620 to rearrange the tributary 8 with tributaries 12 to 15 through the control signals 494. As a result, the system limit, which has been degraded by the BER of 1.5E-2 for the core C08, is now relieved by the equal BER of 4.06E-3 for the cores C08 and C12 to C15. This corresponds to an improvement of the system margin by 1.73 dB.

Fourth Exemplary Embodiment

Figure 6:
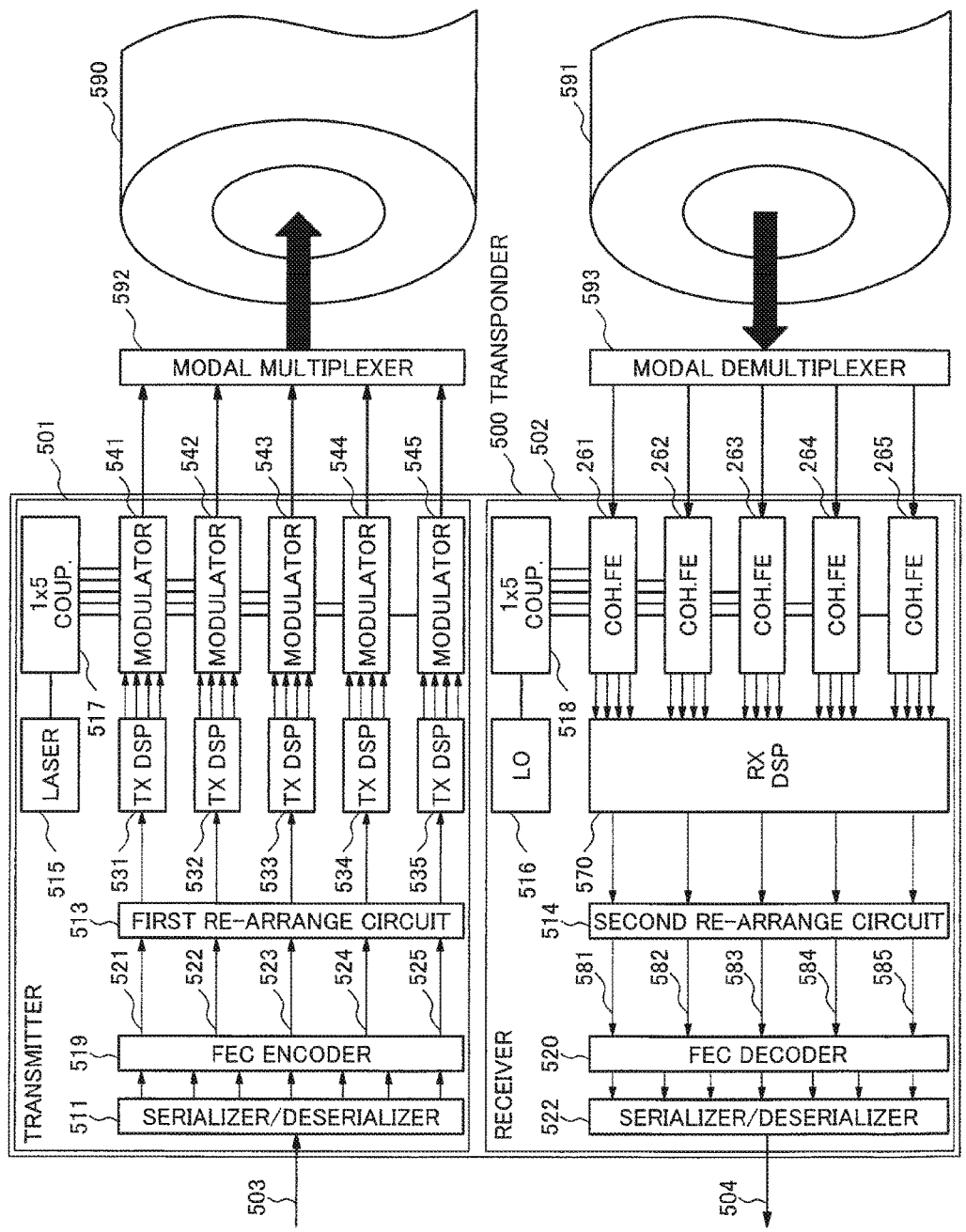
FIG. 6 is a schematic representation of an optical transponder according to the fourth exemplary embodiment of the invention.

FIG. 6 is a schematic representation of an optical transponder 500, including an optical transmitter 501 and an optical receiver 502. The optical transmitter 501 emits 5 optical signals according to a binary data stream 503. A multimode fiber 590 is used in the present embodiment. A modal multiplexer 592 coverts the five optical signals into five optical modes, that is, a fundamental mode LP01, the two configurations of a higher order mode LP11, and the two configurations of another higher order mode LP21. The modal multiplexer 592 launches all the 5 modes into the multimode fiber 590.

A serializer/deserializer 511 converts the binary data stream 503 into 5 parallel tributaries, which are regrouped and FEC encoded by a FEC encoder 519. The FEC frames resulting from the FEC encoder 519 are common for all tributaries output by the serializer/deserializer 511. The FEC encoder 519 outputs 5 tributaries denoted by the numerals from 521 to 525 on FIG. 6.

For the case of n=5 and m=n=5, a first re-arrange circuit 513, transmitting side DSP (TX DSP) denoted by the numerals from 531 to 535, modulators denoted by the numerals from 541 to 545, a laser 515, and a 1×5 coupler 517 are similar to the first re-arrange circuit 113, the transmitting side DSP 131 to 13(n), the modulators 141 to 14(n), to the laser 115, and the 1×n coupler 117, respectively. The 5 signals emitted by the 5 modulators 541 to 545 are output into the modal multiplexer 592, and finally into 5 modes of the multimode fiber 590.

The optical receiver 502 receives 5 light signals output by a modal demultiplexer 593 and demodulates them into a binary data stream 504. The modal demultiplexer 593 converts the multiplexed five modes of lightwave signal from a multimode fiber 591 into five signals. These five signals are received with 5 coherent front ends denoted by the numerals from 561 to 565, respectively.

For the case of n=5 and m=n=5, the coherent front ends 561 to 565, a 1×5 polarization maintaining coupler 518, a local oscillator (LO) 516, and a second re-arrange circuit 514 are similar to the coherent front ends 161 to 16(n), the 1×n polarization maintaining coupler 118, the local oscillator (LO) 116, and the second re-arrange circuit 114, respectively.

A receiving side DSP (RX DSP) 570 receives and demodulates the 5 signals output by the 5 coherent front ends 561 to 565. In addition, the receiving side DSP 570 performs MIMO processing in order to demultiplex numerically on the mixed received modes from the multimode fiber 591. The second re-arrange circuit 514 rearranges the input tributaries into the 5 tributaries denoted by the numerals from 581 to 585. These tributaries are FEC decoded by a FEC decoder 520 because they have common FEC frames encapsulating all of them within common frames. The outputs of the FEC decoder 520 are converted into the binary data stream 504 by a serializer/deserializer 512.

The first re-arrange circuit 513 and the second re-arrange circuit 514 can be chosen as five times five (5×5) switches. In this case, the first re-arrange circuit 513 and the second re-arrange circuit 514 rearrange their input and output tributaries according to patterns that are stored in those circuits.

According to the rearrangement by the first re-arrange circuit 513, the differences in BER, which are caused by modal dependences of losses and gains in the EDFA transmission, are avoided. Therefore, the limit of the system is improved and the FEC decoding according to the FEC decoder 520 becomes possible for wider system conditions.

As mentioned above, according to these exemplary embodiments, it becomes possible to improve the bit error rate of the worst channel among multiple channels for optical transmission system, which improves the system margin. In addition, the probability of the outage in the optical transmission system is reduced.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the exemplary embodiments disclosed above can be described as, but not limited to, the following supplementary notes.

(Supplementary note 1) A method for transmitting optical signal over multiple channels, comprising: (a) firstly rearranging a plurality of tributaries of data to be transmitted in order to scramble the data among the plurality of tributaries; (b) transmitting optical signals modulated with rearranged data generated in step (a) over the multiple channels; (c) receiving the optical signals through the multiple channels; (d) demodulating the optical signals into a plurality of tributaries of the rearranged data; (e) secondly rearranging the plurality of tributaries of the rearranged data in order to recover the plurality of tributaries of data before step (a); and wherein, the number of tributaries of the rearranged data is equal to or more than two and is less than or equal to the number of the multiple channels.

(Supplementary note 2) The method for transmitting optical signal over multiple channels according to Supplementary note 1), further comprising: (f) between step (a) and (b), inserting an overhead into the rearranged data, wherein, the overhead comprises the information about the number of the plurality of tributaries of the rearranged data, and as to which tributaries are rearranged; and (g) between step (d) and (e), recognizing the overhead in order to rearrange the plurality of tributaries of the rearranged data according to the information.

(Supplementary note 3) The method for transmitting optical signal over multiple channels according to any one of Supplementary notes 1 or 2, further comprising: before step (a), encoding the data to be transmitted for Forward Error Correction with frames which are common for the plurality of tributaries; and after step (e), decoding secondly rearranged data generated in step (e) for Forward Error Correction.

(Supplementary note 4) The method for transmitting optical signal over multiple channels according to any one of Supplementary notes 1, 2, and 3, wherein, in step (a), the first rearrangement is done using the information on the transmission characteristics of the multiple channels, so that the data transmitted through the channel with the worst transmission characteristics includes data provided from more than one of the tributaries before the first rearrangement of step (a).

(Supplementary note 5) The method for transmitting optical signal over multiple channels according to any one of Supplementary notes 1, 2, 3, and 4, wherein, in step (a) and (e), m-tuple tributaries are inputted and outputted, one of m-tuple input tributaries is duplicated into m-tuple identical bit streams, each of the other m−1 input tributaries is duplicated into two identical bit streams, one output tributary is selected from m-tuple duplicated input tributaries, each of the other output tributaries is selected from one duplicated input tributary and each of the other m−1 duplicated input tributaries, and wherein, one output tributary includes data from all input tributaries, and the other output tributaries include data from two input tributaries.

(Supplementary note 6) A system for transmitting optical signal over multiple channels, comprising: a first re-arrange means for firstly rearranging a plurality of tributaries of data to be transmitted in order to scramble the data among the plurality of tributaries; a plurality of modulating means for transmitting optical signals modulated with rearranged data generated in the first re-arrange means over the multiple channels; a plurality of coherent front end means for receiving the optical signals through the multiple channels and demodulating the optical signals into a plurality of tributaries of the rearranged data; a second re-arrange means for secondly rearranging the plurality of tributaries of the rearranged data in order to recover the plurality of tributaries of data before being rearranged by the first re-arrange means; and wherein, the number of tributaries of the rearranged data is equal to or more than two and is less than or equal to the number of the multiple channels.

(Supplementary note 7) The system for transmitting optical signal over multiple channels according to Supplementary note 6, further comprising: an overhead insertion means, disposed between the first re-arrange means and the modulating means, for inserting an overhead into the rearranged data, wherein, the overhead comprises the information about the number of the plurality of tributaries of the rearranged data, and as to which tributaries are rearranged; and a overhead recognition means, disposed between the coherent front end means and the second re-arrange means, for recognizing the overhead in order to rearrange the plurality of tributaries of the rearranged data according to the information.

(Supplementary note 8) The system for transmitting optical signal over multiple channels according to any one of Supplementary notes 6 or 7, further comprising: a Forward Error Correction encoding means, disposed at the front of the first re-arrange means, for encoding the data to be transmitted for Forward Error Correction with common frames for each of the plurality of tributaries; and a Forward Error Correction decoding means, disposed at the rear of the second re-arrange means, for decoding secondly rearranged data generated by the second re-arrange means for Forward Error Correction.

(Supplementary note 9) The system for transmitting optical signal over multiple channels according to any one of Supplementary notes 6, 7, and 8, wherein, the first re-arrange means rearranges data using the information of the transmission characteristics of the multiple channels, so that the data transmitted through the channel with the worst transmission characteristics includes data provided from more than one of the tributaries before the first rearrangement by the first re-arrange means.

(Supplementary note 10) The system for transmitting optical signal over multiple channels according to any one of Supplementary notes 6, 7, 8, and 9, wherein, each of the first re-arrange means and the second re-arrange means inputs and outputs m-tuple tributaries, and comprises one signal divider duplicating one of m-tuple input tributaries into m-tuple identical bit streams, m−1 signal dividers duplicating each of the other m−1 input tributaries into two identical bit streams, one switch selecting one output tributary from m-tuple duplicated input tributaries, m−1 switches selecting each of the other output tributaries from one duplicated input tributary and each of the other m−1 duplicated input tributaries, and wherein, one output tributary includes data from all input tributaries, and the other output tributaries include data from two input tributaries.

(Supplementary note 11) A method for transmitting optical signal over multiple channels, comprising the steps of: (a) rearranging a number of tributaries of the data to be transmitted over the multiple channels, so that: the number of output tributaries of the step of rearrangement is equal to the number of input tributaries, the number of rearranged tributaries is chosen from numbers greater than or equal to 2 and less than or equal to the number of the multiple channels, data from any output tributary of the rearrangement step contains data from all input tributaries of the rearrangement step, (b) modulating the data of the rearranged signals onto optical signals, which are transmitted over a number of the channels, which is equal to the number of rearranged tributaries, (c) receiving the optical signals transmitted over the multiple channels of step (b) and demodulating data of the received optical signals, (d) rearranging the data tributaries demodulated from the signals received on the step (c), so that: the data contained in tributaries after rearrangement of step (d) is organized in the same group of tributaries as before the rearrangement of step (a).

(Supplementary note 12) A method for transmitting optical signal over multiple channels, comprising the steps of: (a) rearranging a number of tributaries of the data to be transmitted over the multiple channels, so that: the number of output tributaries of the step of rearrangement is equal to the number of input tributaries and to the number of the multiple channels, data from any output tributary of the rearrangement step contains data from more than one of input tributary of the rearrangement step, (b) modulating the data of the rearranged signals onto optical signals, which are transmitted over a number of the channels, which is equal to the number of rearranged tributaries, (c) receiving the optical signals transmitted over the multiple channels of step (b) and demodulating data of the received optical signals, (d) rearranging the data tributaries demodulated from the signals received on the step (c), so that: the data contained in tributaries after rearrangement of step (d) is organized in the same group of tributaries as before the rearrangement of step (a).

(Supplementary note 13) A method for transmitting optical signal over multiple channels, comprising the steps of: (a) rearranging a number of tributaries of the data to be transmitted over the multiple channels, so that: the number of output tributaries of the step of rearrangement is equal to the number of input tributaries and to the number of the multiple channels, data from any output tributary of the rearrangement step contains data from all input tributaries of the rearrangement step, (b) modulating the data of the rearranged signals onto optical signals, which are transmitted over a number of the channels, which is equal to the number of rearranged tributaries, (c) receiving the optical signals transmitted over the multiple channels of step (b) and demodulating data of the received optical signals, (d) rearranging the data tributaries demodulated from the signals received on the step (c), so that: the data contained in tributaries after rearrangement of step (d) is organized in the same group of tributaries as before the rearrangement of step (a).

(Supplementary note 14) The method for transmitting optical signal over multiple channels according to any one of Supplementary notes 11, 12, and 13, wherein the data of all tributaries of the data rearranged in step (a) is encoded for Forward Error Correction so that: frames of the encoded data contains data from only one of the tributaries before rearrangement of step (a), the encoding is done before step (a).

(Supplementary note 15) The method for transmitting optical signal over multiple channels according to any one of Supplementary notes 11, 12, 13, and 14, wherein: in step (a), the rearrangement is has the characteristics of: periodicity on groups of bits of lengths greater or equal to 2 for each input tributaries a predefined order and finite period length, in step (d), the rearrangement is performed according to the same predefined order as step (a).

(Supplementary note 16) The method for transmitting optical signal over multiple channels according to any one of Supplementary notes 11, 12, 13, 14, and 15, wherein the rearrangement of step (a) is performed so that the output tributaries are determined by cyclic rotation of the input tributaries.

(Supplementary note 17) The method for transmitting optical signal over multiple channels according to any one of Supplementary notes 11, 14, 15, and 16, further comprising the steps of: (e) operating the same operation as step (a), after step (a), on the remaining signal tributaries that are not arranged in step (a), (f) operating the same operation as step (d), after step (d), on the signal tributaries rearranged by step (e).

(Supplementary note 18) The method for transmitting optical signal over multiple channels according to any one of Supplementary notes 11, 12, 13, 14, 15, 16, 17, and 18, wherein: the number of tributaries and the reorganized tributaries, which are reorganized in step (a) can be changed according to orders from the network control plane, the rearrangement of step (d) is changed according to the change of step (a).

(Supplementary note 19) The method for transmitting optical signal over multiple channels according to any one of Supplementary notes 11, 12, 13, 14, 15, 16, 17, and 18, wherein the rearrangement of step (a) is performed based on known and determined information of non equal crosstalk characteristics between multiple channels causing differences in transmission characteristics between multiple channels, the known and determined information can be translated into the array of estimated bit error rates for the numbers 1 to n, where n is the number of the multiple channels, $[BER(1) \ldots BER(n)]$, as the bit error rate estimated for single channel transmission and reception of optical signal over the channel of index n, wherein: the indices of the multiple channels are sorted so that $BER(1) \leq BER(2) \leq \ldots \leq BER(n-1) \leq BER(n)$ the arrangement of step (a) is performed on m tributaries where the number m is chosen from numbers satisfying the condition $$\frac{BER(n) + \sum_{i=1}^{i \le m-1} BER(i)}{m} \le BER(n-1)$$

or the condition n=m, the output tributaries of the rearrangement of step (a) are modulated in step (b) and transmitted over the channels which have indices in the group {{n}∪ [0,m−1]}.

(Supplementary note 20) The method for transmitting optical signal over multiple channels according to any one of Supplementary notes 11, 12, 13, 14, 15, 16, 17, and 18, wherein the rearrangement of step (a) is performed based information provided by monitors associated to receivers receiving signal emitted by the system, the monitor information can be translated into the array of estimated bit error rates for the numbers 1 to n, where n is the number of the multiple channels, [BER(1) . . . BER(n)], as the bit error rate calculated for signal reception and demodulation after transmission over the channel of index n, wherein: the indices of the multiple channels are sorted so that BER(1)≤BER(2)≤ . . . ≤BER(n−1) BER(n), the arrangement of step (a) is performed on m tributaries where the number m is chosen from numbers satisfying the condition $$\frac{BER(n) + \sum_{i=1}^{i \le m-1} BER(i)}{m} \le BER(n-1)$$

or the condition n=m, the output tributaries of the rearrangement of step (a) are modulated in step (b) and transmitted over the channels which have indices in the group {{n}∪ [0,m−1]}.

(Supplementary note 21) The method for transmitting optical signal over multiple channels according to any one of Supplementary notes 11, 12, 13, 14, 15, 16, 17, and 18, wherein the rearrangement of step (a) is performed based information provided by monitors placed inside the network, in which the transmission method is applied, the monitor information can be translated into the array of estimated bit error rates for the numbers 1 to n, where n is the number of the multiple channels, [BER(1) . . . BER(n)], as the bit error rate estimated for signal reception and demodulation after transmission over the channel of index n, wherein: the indices of the multiple channels are sorted so that BER(1) ≤BER(2)≤ . . . ≤BER(n−1)≤BER(n),
the rearrangement of step (a) is performed on m tributaries where the number m is chosen from numbers satisfying the condition $$\frac{BER(n) + \sum_{i=1}^{i \le m-1} BER(i)}{m} \le BER(n-1)$$

or the condition n=m, the output tributaries of the rearrangement of step (a) are modulated in step (b) and transmitted over the channels which have indices in the group {{n}∪ [0,m−1]}.

(Supplementary note 22) A system for transmitting optical signal over multiple channels, comprising: (a) one or more modulators in order to modulate optical carriers according to data to be transmitted by the communication system, (b) a processing circuit, which rearranges a number of tributaries of the data to be modulated by the modulators (a), so that: the number of outputs tributaries of the circuit is equal to the number of input tributaries of the circuit, the number of rearranged tributaries by the circuit is greater than or equal to 2 and less than or equal to the number of modes of the multimode fiber over which data is transmitted, data from any output tributary of the circuit contains data from more than one of input tributary of the rearrangement circuit, (c) an optical receiver receiving the optical signals transmitted over the multiple modes of step (b) and demodulating the received optical signals, (d) a processing circuit rearranging the data tributaries demodulated by the receiver (c), so that: the data contained in tributaries output by the circuit (d) is organized in the same group of tributaries as before the rearrangement by circuit (a).

INDUSTRIAL APPLICABILITY

This invention can be applied to an optical communication system which utilizes the space division multiplexing or the mode division multiplexing.

REFERENCE SIGNS LIST

100, 200, 400, 500, 661-66($n$) optical transponder
101, 201, 401, 501 optical transmitter
102, 202, 402, 502 optical receiver
103, 104, 203, 204, 403, 404, 503, 504 binary data stream
111, 112, 211, 212, 411, 412, 511, 512 serializer/deserializer
113, 213, 413, 513 first re-arrange circuit
114, 214, 414, 514 second re-arrange circuit
115, 215, 415, 515 laser
116, 216, 416, 516 local oscillator (LO)
117 1×n coupler
118 1×n polarization maintaining coupler
13($n$), 231-237, 531-535 transmitting side DSP (TX DSP)
14($n$), 241-247, 541-545 modulator
16($n$), 261-267, 436, 561-565 coherent front end
17($n$), 271-277, 570 receiving side DSP (RX DSP)
190, 191, 290, 291, 490, 491, 681, 682 multicore optical fiber
192, 292, 492 spatial multiplexer
193, 293, 493 spatial demultiplexer
217 1×7 coupler
218 1×7 polarization maintaining coupler
219, 420-438, 519 FEC encoder
220, 440-458, 520 FEC decoder
300 re-arrange circuit
301-307 input
311-317 signal divider
321 7×1 switch
322-327 2×1 switch
391-397 output
431 overhead insertion circuit
432 overhead recognition circuit
433 parallel transmitting side DSP (parallel TX DSP)
434 parallel receiving side DSP (parallel RX DSP)
435 parallel modulator
436 parallel coherent receiver
437 monitor control unit
517 1×5 coupler
518 1×5 polarization maintaining coupler
590, 591 multimode fiber
592 modal multiplexer
593 modal demultiplexer
610 network controller 620, 621, 622 WDM system
630, 631, 632 fiber pair
640 router
650 monitor unit
670 arrayed waveguide
683, 684 multicore Erbium Doped Fiber Amplifiers (EDFA)
C01, C02, C03, C04, C05, C06, C07 core

What is claimed is:

1. A method for transmitting a plurality of optical signals over multiple channels, comprising:
   (a1) coding a plurality of tributaries of data to be transmitted, thereby creating a plurality of coded tributaries;
   (a2) firstly rearranging the plurality of coded tributaries, thereby scrambling data of the plurality of coded tributaries among the plurality of coded tributaries, thereby outputting a plurality of rearranged output coded tributaries, such that one of the plurality of output coded tributaries includes data from each of the plurality of coded tributaries and remaining ones of the plurality of output coded tributaries each include data from two of the plurality of coded tributaries;
   (a3) modulating each one of a plurality of optical carriers with data of one of the plurality of output coded tributaries, thereby creating a plurality of modulated optical signals;
   (b1) transmitting the plurality of modulated optical signals;
   (b2) spatially multiplexing the plurality of modulated optical signals into a plurality of spatially multiplexed channels of an optical fiber;
   (b3) converting the plurality of spatially multiplexed optical signals of the optical fiber into a plurality of individual optical signals;
   (c) receiving the plurality of individual optical signals;
   (d) demodulating each of the plurality of individual optical signals into a plurality of electrical signals;
   (e1) decoding the electrical signals into a plurality of decoded tributaries; and
   (e) secondly rearranging the plurality of decoded tributaries, thereby recovering the plurality of tributaries of data of step (a1);
   wherein, a number of the plurality of tributaries of data is equal to or more than two and is less than or equal to a number of the multiple channels.

2. The method for transmitting a plurality of optical signals over multiple channels according to claim 1, further comprising:
   (f) between step (a3) and (b1), inserting an overhead into the rearranged plurality of coded tributaries, wherein, the overhead comprises information about a number of the plurality of coded tributaries; and
   (g) between step (d) and (e1), recognizing the overhead.

3. The method for transmitting a plurality of optical signals over multiple channels according to claim 1, further comprising:
   before step (a1), encoding the data to be transmitted for Forward Error Correction with frames which are common for the plurality of tributaries of data; and
   after step (e), decoding the plurality of tributaries of data for Forward Error Correction.

4. The method for transmitting a plurality of optical signals over multiple channels according to claim 1, wherein,
   in step (a2), the firstly rearranging is done using information on transmission characteristics of the multiple channels, so that data transmitted through a channel with worst transmission characteristics includes data provided from more than one of the plurality of tributaries of data of step (a1).

5. The method for transmitting a plurality of optical signals over multiple channels according to claim 1, wherein,
   in step (a2);
      the plurality of coded tributaries comprises m-tuple input tributaries;
      a first one of the m-tuple input tributaries is duplicated into m-tuple identical bit streams,
      each one of a remaining m−1 input tributaries is duplicated into two identical bit streams,
      one output tributary is selected from one of the m-tuple identical bit streams and one of the two identical bit streams from each of the remaining m−1 input tributaries by a first switch,
      one output tributary is selected from one of the m-tuple identical bit streams and one of the two identical bit streams from one of the remaining m−1 input tributaries by each of m−1 second switches, and wherein,
      the first switch outputs an output coded tributary that includes data from all of the m-tuple input tributaries, and
      each of the m−1 second switches outputs an output coded tributary that includes data from two of the m-tuple input tributaries.

6. A system for transmitting a plurality of optical signals over multiple channels, comprising:
   a plurality of transmitting side digital signal processors which code a plurality of tributaries of data to be transmitted, thereby creating a plurality of coded tributaries;
   a first re-arrange circuit which firstly rearranges the plurality of coded tributaries, thereby scrambling the data among a plurality of coded tributaries and outputs a plurality of output coded tributaries, such that one of the plurality of output coded tributaries includes data from each of the plurality of coded tributaries and remaining ones of the plurality of output coded tributaries each include data from two of the plurality of coded tributaries;
   a plurality of modulators which each modulate one of a plurality of optical carriers with data of one of the plurality of output coded tributaries, thereby creating a plurality of modulated optical signals, and which each transmit a respective one of the plurality of modulated optical signals;
   a spatial multiplexer which spatially multiplexes the plurality of modulated optical signals into a plurality of spatially multiplexed channels of an optical fiber;
   a spatial demultiplexer which converts the spatially multiplexed channels of the optical fiber into a plurality of individual optical signals;
   a plurality of coherent front ends which respectively receive the plurality of individual optical signals from the spatial demultiplexer and respectively demodulate the plurality of individual optical signals into a plurality of electrical signals;
   a plurality of receiving side digital signal processors which respectively decode the plurality of electrical signals into a plurality of decoded tributaries; and
   a second re-arrange circuit which secondly rearranges the plurality of decoded tributaries, thereby recovering the plurality of tributaries of data in a state in which the plurality of tributaries were input into the plurality of transmitting side digital signal processors;

wherein, a number of the plurality of decoded tributaries is equal to or more than two and is less than or equal to a number of the multiple channels.

7. The system for transmitting a plurality of optical signals over multiple channels according to claim 6, further comprising:
an overhead insertion circuit, connected between the first re-arrange circuit and the plurality of modulators, which inserts an overhead into the rearranged plurality of coded tributaries, wherein,
the overhead comprises information about a number of the rearranged plurality of coded tributaries; and
a overhead recognition circuit, connected between the coherent front ends and the second re-arrange circuit, which recognizes the overhead.

8. The system for transmitting a plurality of optical signals over multiple channels according to claim 6, further comprising:
a Forward Error Correction encoder, connected at a front of the first re-arrange circuit, which encodes the data to be transmitted for Forward Error Correction with common frames for each of the plurality of tributaries; and
a Forward Error Correction decoder, connected at the rear of the second re-arrange circuit, which decodes the plurality of tributaries of data for Forward Error Correction.

9. The system for transmitting a plurality of optical signals over multiple channels according to claim 6, wherein,
the first re-arrange circuit rearranges data using information of transmission characteristics of the multiple channels, so that data transmitted through a channel with worst transmission characteristics includes data provided from more than one of the plurality of tributaries of data.

10. The system for transmitting a plurality of optical signals over multiple channels according to claim 6, wherein,
the first re-arrange circuit receives the plurality of coded tributaries comprising m-tuple input tributaries and outputs m-tuple output coded tributaries, and comprises,
a first signal divider duplicating a first one of the m-tuple input tributaries into m-tuple identical bit streams, and
m−1 second signal dividers, each duplicating one of a remaining m−1 input tributaries into two identical bit streams;
a first switch selecting one output tributary from one of the m-tuple identical bit streams from the first signal divider and one of the two identical bit streams from each of the m−1 second signal dividers,
m−1 second switches, each selecting one output tributary from one of the m-tuple identical bit streams from the first signal divider and one of the two identical bit streams from one of the m−1 second signal dividers, and wherein,
an output coded tributary from the first switch includes data from all of the m-tuple input tributaries, and
an output coded tributary from each one of the m−1 second switches includes data from two of the m-tuple input tributaries.

11. The method for transmitting a plurality of optical signals over multiple channels according to claim 2, further comprising:

before step (a1), encoding the data to be transmitted for Forward Error Correction with frames which are common for the plurality of tributaries of data; and
after step (e), decoding the plurality of tributaries of data for Forward Error Correction.

12. The method for transmitting a plurality of optical signals over multiple channels according to claim 2, wherein,
in step (a2), the firstly rearranging is done using information on transmission characteristics of the multiple channels, so that data transmitted through a channel with worst transmission characteristics includes data provided from more than one of the plurality of tributaries of data of step (a1).

13. The method for transmitting a plurality of optical signals over multiple channels according to claim 3, wherein,
in step (a2), the firstly rearranging is done using information on transmission characteristics of the multiple channels, so that data transmitted through a channel with worst transmission characteristics includes data provided from more than one of the plurality of tributaries of data of step (a1).

14. The method for transmitting a plurality of optical signals over multiple channels according to claim 2, wherein,
in step (a2):
the plurality of coded tributaries comprises m-tuple input tributaries;
a first one of the m-tuple input tributaries is duplicated into m-tuple identical bit streams,
each one of a remaining m−1 input tributaries is duplicated into two identical bit streams,
one output tributary is selected from one of the m-tuple identical bit streams and one of the two identical bit streams from each of the remaining m−1 input tributaries by a first switch,
one output tributary is selected from one of the m-tuple identical bit streams and one of the two identical bit streams from one of the remaining m−1 input tributaries by each of m−1 second switches, and wherein,
the first switch outputs an output coded tributary that includes data from all of the m-tuple input tributaries, and
each of the m−1 second switches outputs an output coded tributary that includes data from two of the m-tuple input tributaries.

15. The method for transmitting a plurality of optical signals over multiple channels according to claim 3, wherein,
in step (a2):
the plurality of coded tributaries comprises m-tuple input tributaries;
a first one of the m-tuple input tributaries is duplicated into m-tuple identical bit streams,
each one of a remaining m−1 input tributaries is duplicated into two identical bit streams,
one output tributary is selected from one of the m-tuple identical bit streams and one of the two identical bit streams from each of the remaining m−1 input tributaries by a first switch,
one output tributary is selected from one of the m-tuple identical bit streams and one of the two identical bit streams from one of the remaining m−1 input tributaries by each of m−1 second switches, and wherein, the first switch outputs an output coded tributary that includes data from all of the m-tuple input tributaries, and each of the m−1 second switches outputs an output coded tributary that includes data from two of the m-tuple input tributaries.

16. The system for transmitting a plurality of optical signals over multiple channels according to claim 7, further comprising:

a Forward Error Correction encoder, connected at a front of the first re-arrange circuit, which encodes the data to be transmitted for Forward Error Correction with common frames for each of the plurality of tributaries; and a Forward Error Correction decoder, connected at the rear of the second re-arrange circuit, which decodes the plurality of tributaries of data for Forward Error Correction.

17. The system for transmitting a plurality of optical signals over multiple channels according to claim 7, wherein, the first re-arrange circuit rearranges data using information of transmission characteristics of the multiple channels, so that data transmitted through a channel with worst transmission characteristics includes data provided from more than one of the plurality of tributaries of data.

18. The system for transmitting a plurality of optical signals over multiple channels according to claim 8, wherein, the first re-arrange circuit rearranges data using information of transmission characteristics of the multiple channels, so that data transmitted through a channel with worst transmission characteristics includes data provided from more than one of the plurality of tributaries of data.

19. The system for transmitting a plurality of optical signals over multiple channels according to claim 7, wherein, the first re-arrange circuit receives the plurality of coded tributaries comprising m-tuple input tributaries and outputs m-tuple output coded tributaries, and comprises, a first signal divider duplicating a first one of the m-tuple input tributaries into m-tuple identical bit streams, and m−1 second signal dividers, each duplicating one of a remaining m−1 input tributaries into two identical bit streams;

a first switch selecting one output tributary from one of the m-tuple identical bit streams from the first signal divider and one of the two identical bit streams from each of the m−1 second signal dividers, m−1 second switches, each selecting one output tributary from one of the m-tuple identical bit streams from the first signal divider and one of the two identical bit streams from one of the m−1 second signal dividers, and wherein, an output coded tributary from the first switch includes data from all of the m-tuple input tributaries, and an output coded tributary from each one of the m−1 second switches includes data from two of the m-tuple input tributaries.

20. The system for transmitting a plurality of optical signals over multiple channels according to claim 8, wherein, the first re-arrange circuit receives the plurality of coded tributaries comprising m-tuple input tributaries and outputs m-tuple output coded tributaries, and comprises, a first signal divider duplicating a first one of the m-tuple input tributaries into m-tuple identical bit streams, and m−1 second signal dividers, each duplicating one of a remaining m−1 input tributaries into two identical bit streams;

a first switch selecting one output tributary from one of the m-tuple identical bit streams from the first signal divider and one of the two identical bit streams from each of the m−1 second signal divider, m−1 second switches, each selecting one output tributary from one of the m-tuple identical bit streams from the first signal divider and one of the two identical bit streams from one of the m−1 second signal dividers, and wherein, an output coded tributary from the first switch includes data from all of the m-tuple input tributaries, and an output coded tributary from each one of the m−1 second switches includes data from two of the m-tuple input tributaries.

* * * * *